(12) United States Patent
Puester et al.

(10) Patent No.: US 8,470,469 B2
(45) Date of Patent: Jun. 25, 2013

(54) METHOD FOR MANUFACTURING A BIPOLAR BATTERY WITH A GASKET

(75) Inventors: Neil H. Puester, Aurora, CO (US); David Hock, Castle Rock, CO (US); Lars Fredriksson, Täby (SE)

(73) Assignee: Nilar International AB, Täby (SE)

( * ) Notice: Subject to any disclaimer, the term of this patent is extended or adjusted under 35 U.S.C. 154(b) by 1152 days.

(21) Appl. No.: 12/203,899

(22) Filed: Sep. 3, 2008

(65) Prior Publication Data

US 2009/0282672 A1   Nov. 19, 2009

Related U.S. Application Data

(60) Division of application No. 10/712,018, filed on Nov. 14, 2003, now Pat. No. 7,445,869, which is a continuation-in-part of application No. 10/434,168, filed on May 9, 2003, now Pat. No. 7,258,949.

(51) Int. Cl.
*H01M 6/42* (2006.01)

(52) U.S. Cl.
USPC ............ 429/153; 429/149; 429/99; 429/185; 429/53; 429/82

(58) Field of Classification Search
USPC ............... 429/185, 53, 82, 150, 153, 99, 149
See application file for complete search history.

(56) References Cited

U.S. PATENT DOCUMENTS

| | | |
|---|---|---|
| 4,008,099 A | 2/1977 | Lindström |
| 4,164,068 A | 8/1979 | Shropshire et al. |
| 4,275,130 A | 6/1981 | Rippel et al. |
| 4,614,025 A | 9/1986 | vanOmmering et al. |
| 5,344,723 A | 9/1994 | Bronoel et al. |
| 5,611,823 A * | 3/1997 | Klein ........................... 29/623.5 |
| 5,618,641 A | 4/1997 | Arias |
| 5,688,615 A | 11/1997 | Mrotek et al. |
| 5,916,709 A | 6/1999 | Arias et al. |
| 6,139,987 A | 10/2000 | Koo et al. |
| 6,969,567 B1 * | 11/2005 | Higley et al. ................. 429/149 |
| 2003/0072998 A1 | 4/2003 | Fredriksson et al. |
| 2005/0260493 A1 | 11/2005 | Frederiksson et al. |

FOREIGN PATENT DOCUMENTS

| | | |
|---|---|---|
| EP | 0 631 338 A1 | 12/1994 |
| EP | 0 676 822 A1 | 10/1995 |
| WO | WO 01/03224 A1 | 1/2001 |
| WO | WO 01/03225 A1 | 1/2001 |

\* cited by examiner

*Primary Examiner* — Milton I Cano
*Assistant Examiner* — Stephen Yanchuk
(74) *Attorney, Agent, or Firm* — Capitol City TechLaw (57) ABSTRACT

A gasket is for use in a starved electrolyte bipolar battery. The gasket may be made from a hydrophobic material in the shape of a frame to prevent the creation of an electrolyte path between adjacent cells when mounted in a battery. The frame may be designed to at least partially encompass a biplate when mounted in a bipolar battery, and include a device or way to permit gas passage through the gasket. The gasket may be made from a material with deformable properties to provide a sealing to a biplate and/or endplate when mounted in a bipolar battery, whereby an outer pressure tight seal of the battery may be obtained. A starved bipolar battery and a method for manufacturing a starved bipolar battery are also disclosed.

9 Claims, 6 Drawing Sheets

METHOD FOR MANUFACTURING A BIPOLAR BATTERY WITH A GASKET

CROSS REFERENCE TO RELATED APPLICATIONS

This application is a Divisional Application of U.S. application Ser. No. 10/712,018, filed Nov. 14, 2003 (now U.S. Pat. No. 7,445,869), which is a Continuation-In-Part Application of U.S. application Ser. No. 10/434,168, filed May 9, 2003 (now U.S. Pat. No. 7,258,949), which claims priority from Swedish Patent Application No. 0203535-0, filed Nov. 29, 2002, the entire contents of all of which are hereby incorporated herein by reference.

BACKGROUND

1. Technical Field

The present invention generally relates to a gasket, and/or to a bipolar battery including at least one gasket. The present invention also generally relates to a method for manufacturing a bipolar battery.

2. Discussion of Related Art

A bipolar battery construction includes an electrically conductive bipolar layer, so called biplate, that serves as an electrical interconnection between adjacent cells in the battery as well as a partition between the cells. For efficient utilization of the bipolar construction, the biplate should be sufficiently conductive to transmit current from cell to cell, chemically stable in the cell's environment, capable of making and maintaining good contact to the electrodes and capable of being electrically insulated and sealable around the boundaries of the cell so as to contain electrolyte in the cell.

The above is more difficult to achieve in rechargeable batteries due to the charging potential that can generate gas inside the battery, and in alkaline batteries due to the creep nature of electrolyte. Achieving a desired combination of these characteristics has proven very difficult.

For maintenance-free operation, it is desirable to operate rechargeable batteries in a sealed configuration. However, sealed bipolar designs typically utilizes flat electrodes and stacked-cell constructions that are structurally poor for containment of gases present and generated during cell operation. In a sealed construction, gases generated during charging should be chemically recombined within the cell for stable operation. The pressure-containment requirement creates additional challenges in the design of a stable bipolar configuration.

New desires in the field of transportation, communications, medical and power tools are generating specifications that existing batteries cannot meet. These include higher cycle life and the need for rapid and efficient recharges.

NiMH systems are seen as the alternative to meet cycle life, but costs for existing conventional fabrication are too high.

In U.S. Pat. No. 5,344,723 by Bronoel et al., a bipolar battery is disclosed having a common gas chamber, which is created by providing an opening through the biplate (conductive support/separator). The opening is also provided with a hydrophobic barrier to prevent passage of electrolyte through the hole. Although a problem with pressure differences between the cells may be avoided, there is still a disadvantage with the described battery. The outer sealing around the edge of each biplate still has to be fluid-tight, which is very difficult to achieve. If the outer sealing is not fluid-tight, the electrolyte, contained in the separator between the electrodes and in the electrodes, may migrate from one cell to another.

In the published international patent application WO 03/026042 A1 assigned to the present applicant, the entire content of which is hereby incorporated herein by reference, a different solution compared to the solution described in U.S. Pat. No. 5,344,723, is proposed where a hydrophobic barrier is introduced around the electrodes instead of around the opening in the biplate. A pressure relief valve is also introduced to prevent a too high pressure to build up inside the case. It may, however, be rather expensive to manufacture a bipolar battery of this design.

SUMMARY

In view of the above, one need to construct a new bipolar battery has been discovered, having less number of components and/or using less complicated processing steps to manufacture a bipolar battery, for example.

One possible object of an embodiment of the present application may be to provide a gasket that will simplify the manufacturing process of a bipolar battery.

A further possible object of an embodiment may be to provide a bipolar battery that is easy to manufacture.

Still a further possible object of an embodiment of the invention may be to provide a method for manufacturing a bipolar battery, using the gasket, that is simplified compared to prior art methods.

One possible advantage of an embodiment of the present invention is that more energy may be stored in the battery compared to prior art batteries. This is because the gasket can act as a hydrophobic barrier, a pressure tight sealing and provides means to create a common gas space within the battery. This in turn may make it possible to more efficiently use the available space and larger electrodes may be used compared to prior art batteries.

Another advantage is that the present invention provides additional cost and assembly benefits compared to prior art devices.

Further objects and advantages of embodiments of the present invention will be apparent to those skilled in the art from the following detailed description of the disclosed bipolar electrochemical battery and the biplate assembly.

BRIEF DESCRIPTION OF THE DRAWINGS

The present invention will become more fully understood from the detailed description of example embodiments given hereinbelow and the accompanying drawings, which are given by way of illustration only and thus are not limitative of the present invention.

Further, the different embodiments shown in the appended drawings are not to scale or proportion, but exaggerated to point out different features for the sake of clarity.

DESCRIPTION OF EXAMPLE, NON-LIMITING EMBODIMENTS

Some benefits of the bipolar battery design include simplicity and low resistance losses. The parts count of the battery is relative low, including only end plates and biplates, with appropriate assembly of electrodes, separators and electrolyte and sealing components. Batteries of a desired voltage are constructed by stacking the required number of biplates. The electrical connections between the cells are made as the battery is stacked, since each biplate is electrically conductive and impervious to electrolyte.

With the terminals at each end, the flow of current is perpendicular to the plate, which ensures uniform current and voltage distribution. Since the current path is very short the voltage drop is significantly reduced.

Bipolar batteries will also have significantly reduced weight, volume and manufacturing costs due to elimination of components and the manufacturing approach.

One large problem with bipolar batteries is obtaining a reliable seal between cells within the bipolar battery. Different solutions to this problem have been disclosed in the published international patent applications WO 03/009413, WO 03/026055 and WO 03/026042, and in the non-published pending U.S. application Ser. Nos. 10/434,167 and 10/434,168, all assigned to the present applicant and all hereby incorporated herein by reference in their entirety.

The seal on a cell is of extreme importance for all types of batteries, and bipolar batteries are no exception. Individual cells contain the active materials (for NiMH batteries it is Nickel hydroxide positive and metal hydride hydrogen storage alloy negative, respectively), separator and electrolyte. The electrolyte in the separator is required for ion transport between the electrodes and the separator provides insulation to the conduction of electronic current flow between the electrodes. The best designs, optimised for longevity, weight and volume, require recombination of gasses.

Batteries always produce gasses as they are charged. The gassing rate increases as the battery nears full charge, and reaches maximum when fully charged. The gasses which are produced are primarily oxygen and hydrogen.

For Nickel based bipolar batteries, such as NiMH and NiCd, oxygen will recombine relatively rapidly with available active material in the negative electrode. Batteries are normally designed so oxygen will be the first gas generated if the cell is overcharged. This includes two actions:
1) Overbuild the negative active material, generally by 30%, to ensure that the positive electrode, which will gas oxygen on charge, will be the first to gas.
2) In a starved electrolyte battery, provide for gas passage from the positive to the negative, where the oxygen will recombine. The gas passages are obtained by controlling the amount of electrolyte within the pores of the electrode and through the separator. All surfaces of the electrode must be covered by a thin layer of electrolyte for the transport of ions, but the layer must be thin enough to permit gas diffusion through the layer, and must allow gas passages throughout the active layers and the separator.

The negative electrode would gas hydrogen if overcharged. Because gaseous Hydrogen does not recombine quickly, pressure would build up within the cell. The oxygen recombination effectively discharges the negative at the same rate it is being charged, thus preventing overcharge of the negative.

The surface area of the active material, combined with the uniform voltage distribution of the bipolar design, enhances rapid recombination.

For clarity sake, a starved electrolyte battery is defined as is an essentially moist but not wet construction, as opposed to flooded batteries like a typical lead acid car battery.

The bipolar approach will permit that the voltage drop across the active material will be uniform in all areas, so that the entire electrode will come up to full charge at the same time. This will avoid a large problem in conventional constructions, where parts of an electrode are overcharging and gassing while other (remote) areas of the electrode are not yet fully charged.

The cells in regular batteries are sealed to contain the electrolyte both for proper performance of the cells, and to prevent electrolyte paths, i.e. continuous ionically conductive paths, between adjacent cells. The presence of electrolyte paths between cells will allow the electrolyte-connected cells to discharge at a rate that is determined by the resistance of the path (length of path and cross section of path). The seals on bipolar batteries are more important because the electrolyte path is potentially much shorter. It should be noted that an important feature of this disclosure is the use of a gasket with an integrated electrolyte barrier to minimize or eliminate the conductivity of any potential ionic conduction path. An additional concern is the amount of heat generated by operation of the cell. Depending on the magnitude of heat generated, the design should be able to reject the heat and maintain a safe operating temperature.

If an electrolyte path is developed between cells, a small intercellular leakage can be overcome by the periodic full charging of the battery. The battery may be overcharged by a set amount and at a low rate. The low rate would allow fully charged cells to recombine gasses without generating pressure and dissipate the heat from the recombination/overcharge. Cells that have small intercellular electrical leakage paths would become balanced.

It is rarely necessary that a battery be fully charged to achieve its useful function. Batteries are routinely over specified and overbuilt. If an operation requires 50 AH (Ampere Hours), the requirement is usually specified at least 10% higher. Since batteries lose capacity over their lifetime, the capacity of a new battery is increased by the expected loss, resulting in possibly a 70 AH requirement for a new battery in this example. The manufacturer will probably have a median design target of 75 AH to allow for variations in the manufacturing process. Much of this overbuild is to compensate for the life capacity degradation that is caused by the overcharging.

One feature of an embodiment of the novel bipolar batteries is the creation of a common gas space within the battery. The device for creating a common gas space for all cells in a bipolar battery includes a gasket having a predetermined shape. The gasket is arranged between adjacent biplates and/or a biplate and an end plate, as described below. The gasket is preferably made with a thermoplastic elastomer compound that forms a seal with the biplate under pressure. One or more gas channels are molded into the frame to ensure gas leakage path. When several gaskets are stacked upon each other, as described in connection with FIG. 7, a common gas space will be created which will avoid a pressure difference between the cells in a bipolar battery.

Figure 1:
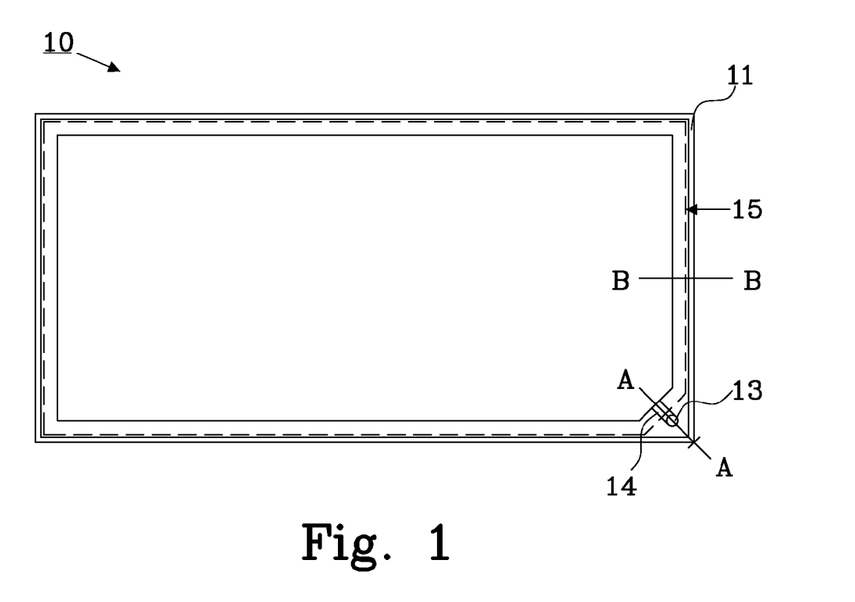
FIG. 1 shows a first embodiment of a gasket according to an embodiment of the present invention.

FIG. 1 shows a first embodiment of a gasket 10 according to the invention. The gasket 10 is manufactured in a hydrophobic material having deformable properties, such as an elastomer or other material that create a continuous seal when deformed, to be able to function as a sealing. The gasket preferably has elastic properties, and a suitable material is a thermoplastic elastomer. Thermoplastic elastomers may be obtained from several manufacturers e.g. Engage® 8407 available from DuPont Dow Elastomers, DYNAFLEX® G2780-001 available from GLS Corp. or KRATON™ G-7705 available from Kraton™ Polymers. The gasket is preferably injection molded into the desired size and shape.

The gasket 10 is provided with a rim 11 at the edge on the upper side and a corresponding indentation 12 on the reverse side. The rim 11 and the indentation 12 will provide alignment of the gaskets when they are stacked upon each other in an assembled battery, see FIG. 7. The rim further serves to align the biplate relative to the gasket. The gasket is further provided with a through-hole 13 and a groove 14 to connect the through-hole 13 to the space on the inside of the gasket 10 when a biplate is mounted to the gasket. The through-hole 13 and the groove 14 provide a gas channel between adjacent cells in the assembled battery, and the hydrophobic properties of the gasket prevent electrolyte from creating an ionically conductive path between adjacent cells. The gasket thus can, when mounted:
1) prevent electrolyte from creating an ionically conductive path (leakage) between adjacent cells in a bipolar battery,
2) provide a gas channel between adjacent cells to create a common gas space within a bipolar battery,
3) provide an outer pressure tight seal for the cells in a bipolar battery, and/or
4) provide an electrically insulating support structure between biplates and between the biplates and the endplates.

Figure 2A:
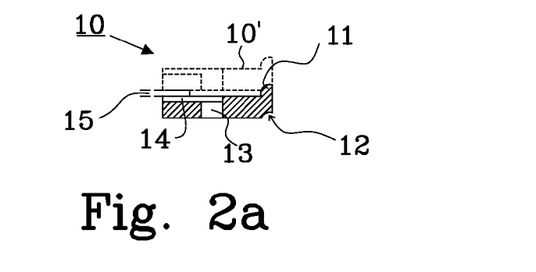
FIGS. 2a and 2b show cross-sectional views of the gasket in FIG. 1.
Figure 2B:
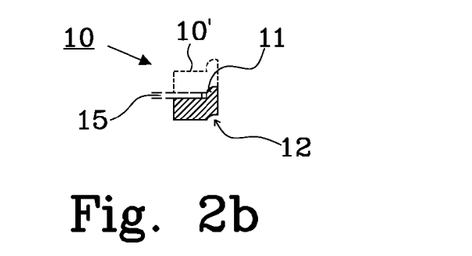

FIG. 2a shows a cross-sectional view of the gasket in FIG. 1 along A-A, and FIG. 2b sows a cross-sectional view of the gasket in FIG. 1 along B-B. The presence of a second gasket 10' is indicated in the figures to further show how the rim 11 is intended to be received in the indentation when mounted in a battery.

A biplate 15 is shown with a dashed line in FIGS. 1, 2a and 2b to indicate the position of a biplate 15 in an assembled bipolar battery. It should be noted that the biplate should not occlude the opening of the through-hole 13 to provide the common gas space, but a portion of the groove 14 should be covered by a biplate 15 to prevent electrolyte leakage between cells. A biplate with a hole aligned with the hole in the gasket may alternatively be employed to serve the purposes listed here.

Figure 3:
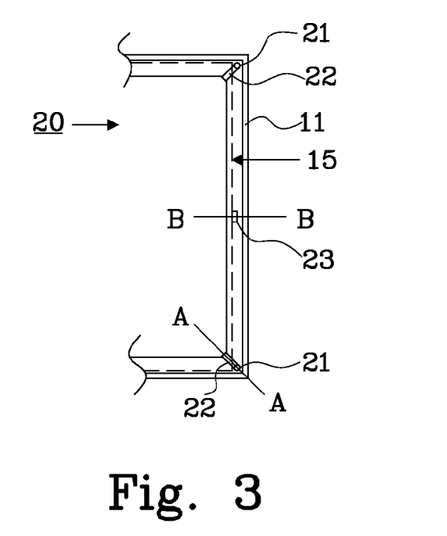
FIG. 3 shows a second embodiment of a gasket according to an embodiment of the present invention.

FIG. 3 shows a partial view of a second embodiment of a gasket 20 according to the invention. The gasket 20 is provided with a rim 11 and a corresponding indentation 12, as described above. The gasket is provided with two rather small through-holes 21, each having a groove 22 to connect the through-hole 21 to the space inside the gasket as previously described in connection with FIG. 1. A biplate 15 is also shown with a dashed line to indicate the position of a biplate 15 in an assembled bipolar battery. To prevent the biplate to be misaligned during assembling of the battery, a guidance device 23, such as a boss, may be provided on the gasket 20. It should be noted that it is advantageous that the boss is designed in such a way that a passageway may be established between the two through-holes beside the biplate of each cell. In this embodiment the boss does not stretch all the way from the biplate to the rim.

Figure 4A:
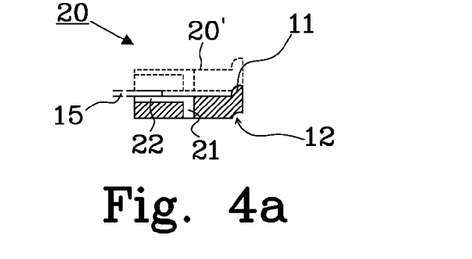
FIGS. 4a and 4b show cross-sectional views of the gasket in FIG. 3.
Figure 4B:
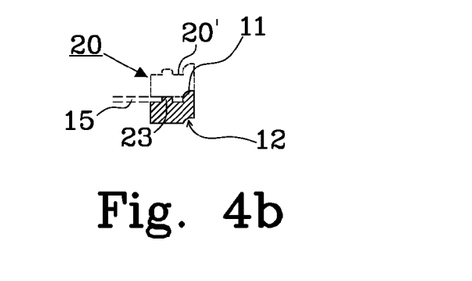

FIG. 4a is a cross-sectional view along A-A in FIG. 3, and FIG. 4b is a cross-sectional view along B-B in FIG. 3. The presence of a second gasket 20' is indicated in the figures to further show how the rim 11 is intended to be received in the indentation 12 when mounted in a battery.

Figure 5:
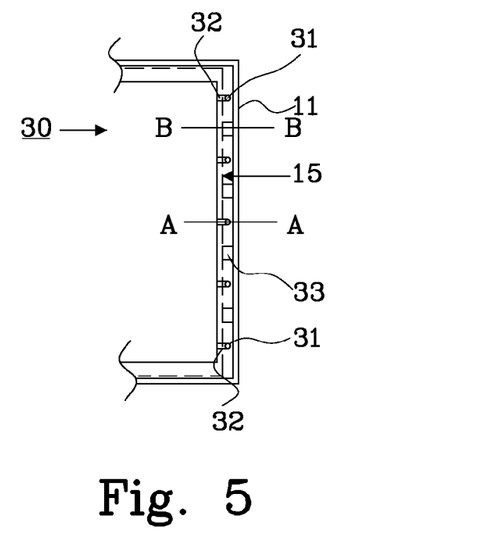
FIG. 5 shows a third embodiment of a gasket according to an embodiment of the present invention.

FIG. 5 shows a partial view of a third embodiment of a gasket 30 according to the invention. The gasket 30 is provided with a rim 11 and a corresponding indentation 12, as described above. The gasket is provided with five rather small through-holes 31, each having a groove 32 to connect the through-hole 31 to the space inside the gasket as previously described in connection with FIG. 1. A biplate 15 is also shown with a dashed line to indicate the position of a biplate 15 in an assembled bipolar battery. To prevent the biplate to be misaligned during assembling of the battery, several guidance devices 33, such as bosses, may be provided on the gasket 30. It should be noted that it is advantageous that the bosses are designed in such a way that a passageway may be established between the five through-holes beside the biplate of each cell. In this embodiment the bosses are lower than the thickness of the biplate.

Figure 6A:
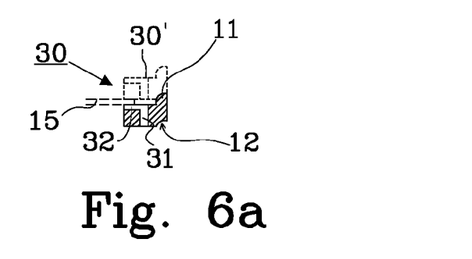
FIGS. 6a and 6b show cross-sectional views of the gasket in FIG. 3.
Figure 6B:
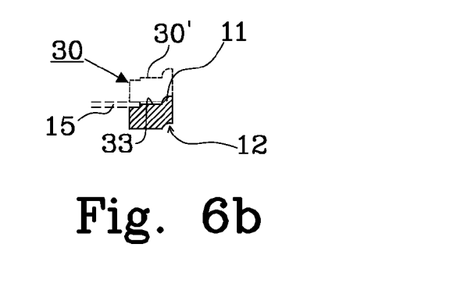

FIG. 6a is a cross-sectional view along A-A in FIG. 5, and FIG. 6b is a cross-sectional view along B-B in FIG. 5. The presence of a second gasket 30' is indicated in the figures to further show how the rim 11 is intended to be received in the indentation 12 when mounted in a battery.

It may be advantageous, but necessarily required, to alter the design of the gasket in contact with the endplates to better nest and seal with the endplates. The endplates may have a different size than the biplates, so the gasket may need to conform to the different size.

Figure 7:
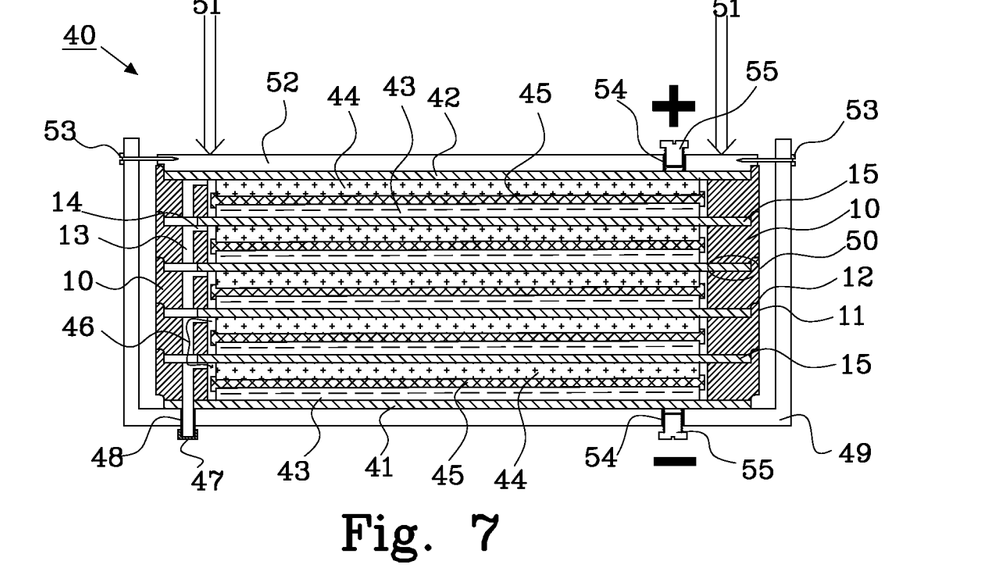
FIG. 7 shows a cross-sectional view of a bipolar battery according to an embodiment of the invention.

FIG. 7 shows a bipolar battery 40 in cross section having five cells. The battery includes a negative end plate 41 and a positive end plate 42, each having a negative electrode 43 and a positive electrode 44, respectively. Four biplate assemblies, including a negative electrode 43 a biplate 15, and a positive electrode 44, are stacked on top of each other in a sandwich structure between the two end terminals. A separator 45 is arranged between each adjacent negative and positive electrodes making up a cell, the separator 45 contains an electrolyte and a predetermined percentage of gas passages, about 5% is a typical value for gas passages in starved electrolyte batteries.

A gasket 10, as described in connection with FIG. 1, is provided between adjacent biplates and/or a biplate and an end plate. As indicated in the figure by the arrow 46, gas may flow from one cell to another and thereby all cells share a common gas space through the gas passages in the gasket. If an electrode in a cell starts to gas before the others, this pressure will be distributed through-out the whole common gas space. The gas will pass from a cell, through a groove 14 and via a through-hole 13 of a first gasket to a groove 14 of a second gasket, and thereafter into a second cell.

If the pressure within the common space exceeds a predetermined value, a pressure relief valve 47 will open to connect the common gas space with the ambient environment. The pressure relief valve 47 is arranged through one of the end plates, in this example the negative end plate 41 and comprises a feed-through 48. in an alternative embodiment, the feed-through 48 may be integrally formed onto the endplate 41.

Additionally, a pressure sensor (not shown) may also be mounted through one of the end plates to measure the actual pressure inside the battery cells. The case 49 is preferably made from an insulating material, but may naturally be made from a conductive material. Each frame is preferably made from an insulating material and is designed in such a way to ensure electrical insulation between each biplate 15 and a possibly conductive case. The gasket 10 is provided with a recess 50 where the biplates and the positive end terminal 42 are placed during manufacture and are maintained during operation by applying a pressure as indicated by the arrows 51. The recess 50 is the space between two gaskets that will be established when the indentation 12 and the rim 11 of the gasket are in communication.

The pressure is maintained by fixating a lid 52 to the case 49 by some kind of fastening means 53, such as screws, and will ensure that each cell has a predetermined width, which is approximately equal to the compressed height of the gasket 10.

Alternatively, the lid 52 may be fixed in position by any of several other standard way, including crimping, interference fits, epoxy, heat seal or solvent, depending of the battery case construction and battery application criteria.

It should be noted that there may be a space between the outside of the gasket 10 and the inside surface of the case 49, since the gasket itself provide the pressure tight seal for the battery. The case 49 with the lid 52 provide a practical solution for creating the required pressure to establish the pressure tight seal between the gaskets and the biplates and the positive and negative endplates.

Relief valves and pressure sensors are readily available to a man skilled in the arts and are not described in more detail.

Each end plate is provided with a terminal connection. The terminal connection includes a terminal feed-through 54, which preferably is secured to the case 49 by press-fitting. Each terminal feed-through 54 is attached to each endplate 41 and 42, respectively, by soldering, gluing, welding etc. to establish a good electrical contact. The terminal feed-through is in this embodiment provided with internal threads. Screws 55 may be used to attach any type of terminal connectors to the battery.

It should be noted that although FIG. 7 shows a bipolar battery having a negative endplate 41 arranged in the lower portion of the battery, this feature is not essential for the construction of the battery. The negative and positive terminal positions of the battery are interchangeable by trading the positions of all the negative and positive electrodes in the battery. The function of the battery will still be the same.

Figure 8:
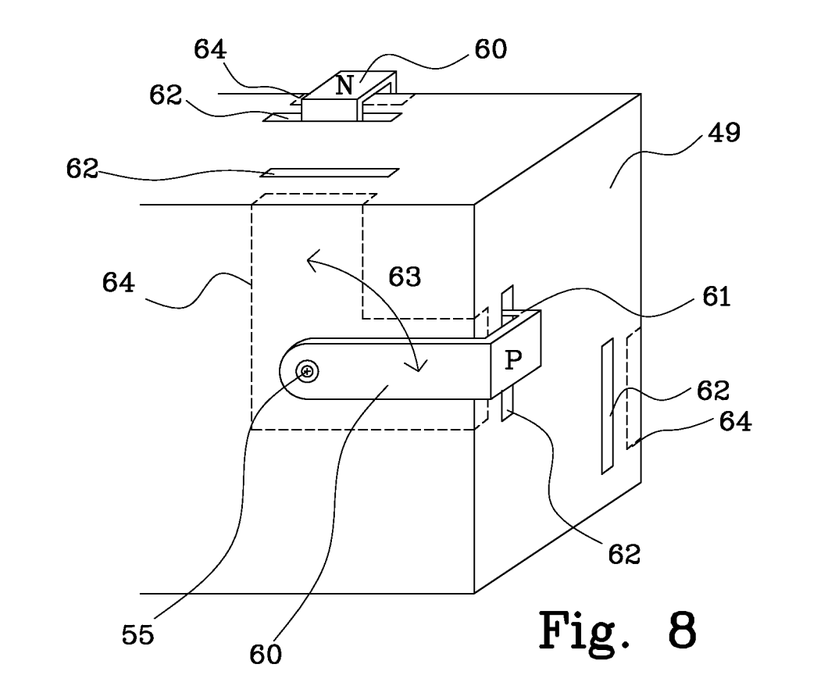
FIG. 8 shows a perspective view of a battery according to an embodiment of the invention provided with adjustable terminal connectors.

FIG. 8 shows a perspective view of a battery 40 according to an embodiment of the invention provided with adjustable terminal connectors 60. A terminal connector 60 is attached to each endplate of the battery via the terminal feed-through 54, using a screw 55. Each terminal connector may be directed either to the short side of the battery or the long side of the battery. The terminal connector marked with a "P" (positive terminal) is directed to the short side of the battery and the terminal connector is bent in such a way that the far end 61 of the terminal connector 60 may be inserted into a groove 62 arranged in the case 49 of the battery when the terminal connector is secured to the terminal feed-through 54 by the screw 55. The terminal connector is thus secured to the case.

The second terminal connector marked "N" (negative terminal) is in this figure directed toward the long side of the battery and likewise secured to the case 49. Each terminal connector may be rotated to a different position, as indicated by the arrow 63.

Furthermore, there is a possibility to embed the terminal connectors into the case by providing a depression in the case, as indicating by the dashed lines 64, to allow close stacking of batteries without the risk of shorting the terminal connectors.

The terminal connectors could also be provided with some type of insulating material, e.g. red for the positive terminal connector and black for the negative terminal connector. The positions of the grooves 62 on each side of the case are preferably offset, to facilitate the use of bus bar connections.

Figure 9A:
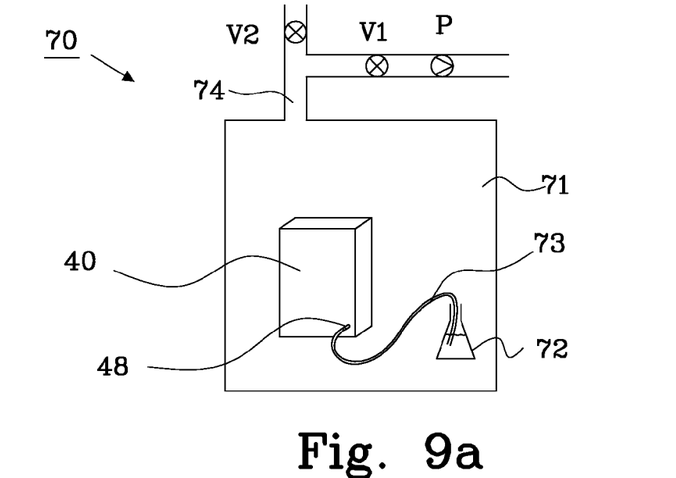
FIGS. 9*a*-9*c* show three different devices for vacuum filling a bipolar battery with a common gas space.
Figure 9B:
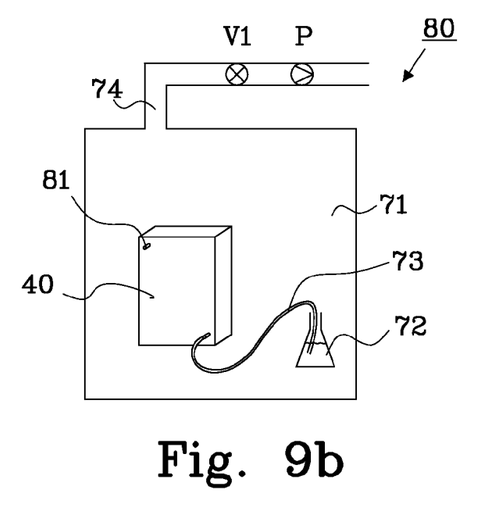
Figure 9C:
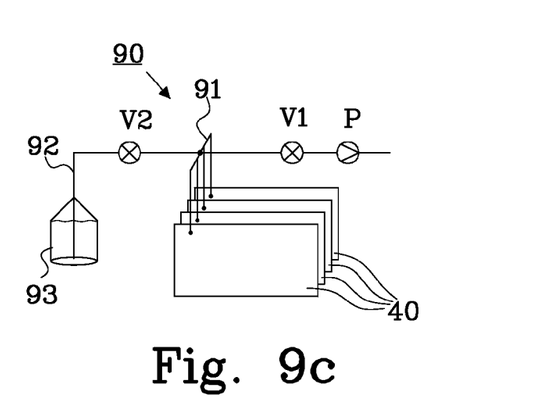

FIGS. 9a to 9c show three different devices for vacuum filling a bipolar battery. Normally, a NiMH-battery is filled during the assembling of the battery, and this may naturally also be performed with this type of battery, but it is possible to use vacuum filling techniques to introduce electrolyte into the finished battery.

FIG. 9a shows a first filling device 70, where a bipolar battery 40 is placed inside a vacuum chamber 71 together with a beaker 72 of electrolyte (e.g. 6M KOH). A tube 73, preferably flexible, is attached to the feed-through 48 of the pressure relief valve 47. A vacuum pipe 74 is connected to the vacuum chamber 71 and thereafter divided into two branches, where a first branch is provided with a first valve V1 in series with a vacuum pump P, and the second branch is provided with a second valve V2.

The procedure of vacuum filling a battery comprises the following steps:

1) Open valve V1 and let the pump P evacuate the air inside the vacuum chamber 71. The air inside the battery 40 will also be evacuated through the tube 73, which can be seen as bubbles in the electrolyte.

2) Close valve V1 when a desired vacuum pressure has been obtained inside the vacuum chamber 71.

3) Open valve V2 to increase the pressure inside the vacuum chamber 71 by letting ambient air flow into the chamber. The increased pressure inside the chamber will push electrolyte into the battery 40 and slowly fill the separators and voids inside the battery with electrolyte. The electrolyte is sucked into the battery using capillary force.

FIG. 9b shows a second filling device 80 where a bipolar battery 40 also is placed inside a vacuum chamber 71 together with a beaker 72 of electrolyte (e.g. 6M KOH). A tube 73, preferably flexible, is attached to the feed-through 48 of the pressure relief valve 47. A second opening 81 into the common gas space is provided in the case of the battery. The opening could be used for arranging a pressure sensor after the electrolyte has been introduced into the battery. A vacuum pipe 74 is connected to the vacuum chamber 71 and a valve V1 is provided in series with a vacuum pump P.

Air will be evacuated from the battery 40 through the opening 81 when the valve V1 is open and the vacuum pump P is decreasing the pressure inside the vacuum chamber 71. When the air is evacuated from the battery, electrolyte will be introduced from the beaker 72, through the tube 73 and in through the feed-through 48 of the pressure relief valve 47. The valve V1 is closed when enough electrolyte has been introduced into the battery. The vacuum chamber 71 is vented and the battery, now filled with electrolyte, can be removed.

FIG. 9c shows a third filling device 90 that does not contain a vacuum chamber. The feed-through 48 of the pressure release valve 47 of several batteries 40 may be connected to a common manifold 91. The manifold 91 is connected to a first valve V1, which is in series with a vacuum pump P. A tube 92 (or pipe) is immersed in a container 93 filled with electrolyte. The tube 92 is connected to the manifold via a second valve V2. The device operates in the following way. The pump will evacuate the air inside all the batteries 40 when the valve V1 is opened. The valve V1 is closed when a sufficient low pressure has been obtained. The valve V2 is thereafter opened and electrolyte will be distributed to all batteries 40 through the manifold. The electrolyte is distributed inside each battery using capillary forces.

The manufacturing process for making a bipolar battery is described in connection with FIGS. 10, 11, 12 and 13.

The first flow chart shown in FIG. 10 describes the process of manufacturing a bipolar battery, as described in connection with FIG. 7, up to a battery without any electrolyte, i.e. a dry battery. The flow starts in step 101 and continues to step 102 and 103 in parallel. In step 102 a feed-through 48 for the pressure relief valve 47 is assembled to the first endplate 41, and in step 103 a terminal feed-through 54 is assembled to the non-conducting case 49.

The first endplate 41 assembled with the pressure relief valve feed-through 48 is mounted in the case 49 being provided with the terminal feed-through 54 in step 104. The terminal feed-through 54 is thereafter attached to the first endplate 41 in step 105, using any of the methods described above.

The desired number of battery cells M is thereafter selected in step 106 and a counter is set to zero, k=0. In step 107, the counter is increased by 1, k=k+1 and the flow continues to step 108, where cell number "k" is assembled, that is a gasket 10; 20; 30, as previously described in connection to FIGS. 1 to 6, is mounted inside the case 49 around the edge of the end plate 41, a first electrode 43 is positioned within the gasket on top of the first endplate 41, one or more separators 45 are thereafter arranged on top of the first electrode 43 and a second electrode 44 is arranged on top of the separator(s) within the gasket. The gasket may alternatively be mounted after the separator(s) have been mounted inside the case 49.

The flow continues to step 109, where a decision is made whether the selected number of cells M has been manufactured. If the answer is "No", the flow is fed back to point 111 via step 110 where a biplate is mounted on top of the gasket. The flow repeats step 108 and 109 until the selected number of cells has been made.

When k=M, the flow continues to step 112 where the lid 52 of the case 49 is provided with a terminal feed-through 54 and a second endplate 42 is assembled to the lid 52. The terminal feed-through 54 is thereafter attached to the second endplate 42 in step 113, using any of the methods described above.

The lid 52 is mounted to the case 49 in step 114 a pressure is applied in step 115 to the lid 52 in a direction 51 previously described in connection with FIG. 7. A dry bipolar battery is thereby finished in step 116.

The process of stacking battery components on top of each other to form the right number of battery cells may naturally be performed in a number of different ways. For instance, biplate assemblies may be provided, each comprising a first electrode attached to a first side of a biplate and a second electrode attached to a second side of the biplate, the first side being opposite to the second side, where the separator material is added in the fed back loop instead of the biplate as disclosed in FIG. 10. It is also possible that the material of each cell is pre-manufactured and each cell is stacked during the assembling process of the battery.

Figure 10:
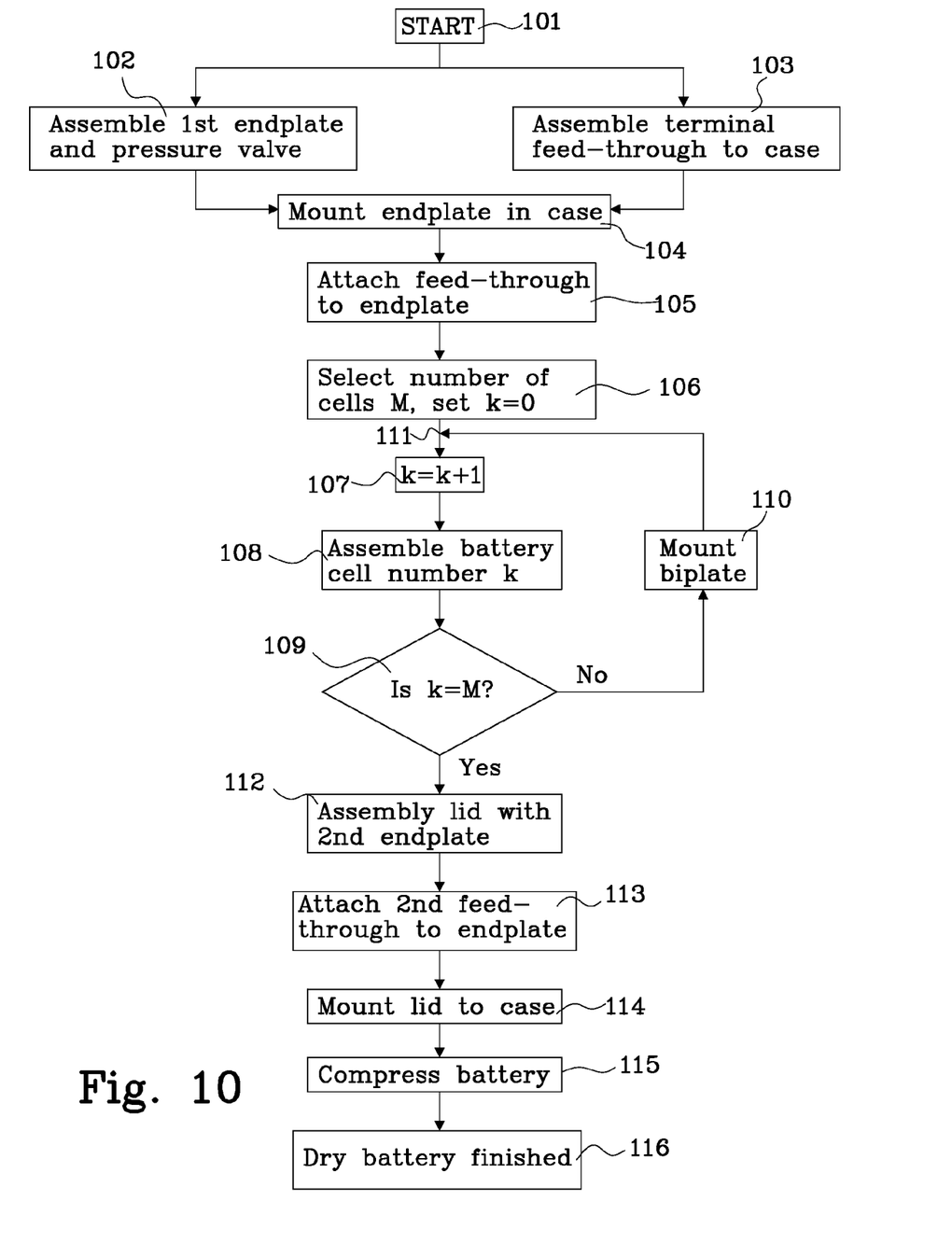
FIG. 10 shows a first flow chart for manufacturing a bipolar battery according to an embodiment of the invention.
Figure 11:
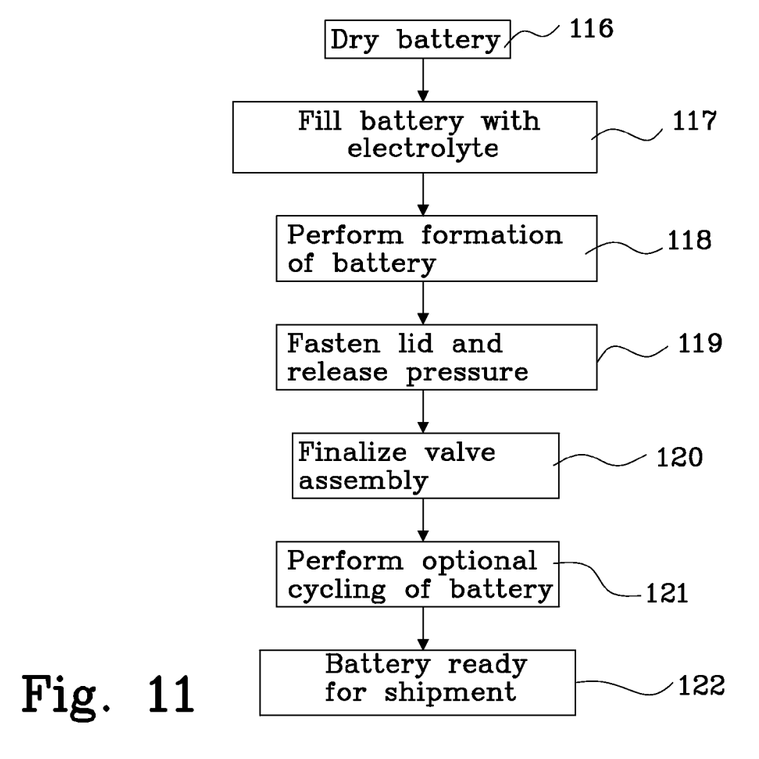
FIG. 11 shows a second flow chart for manufacturing a bipolar battery according to an embodiment of the invention.

FIG. 11 is a flow chart describing the process of producing a functional battery from the dry battery obtained in step 116, FIG. 10. The flow starts in step 116 and continues to step 117 where the battery is filled with electrolyte. The filling process is described in more detail in connection with FIG. 12.

A formation procedure is thereafter performed in step 118 to initialize the battery to normal operation. This formation procedure is described in more detail in connection with FIG. 13.

When the formation is completed, the lid 52 is fasten to the case 49 in step 119 and the pressure applied to the lid previously is released. It is of course possible to first release the pressure and thereafter recompress the lid to the case, fasten the lid 52 to the case 49 and thereafter release the pressure. Alternatively, fasten the lid between steps 115 and 116 in the dry battery assembly procedure.

The assembling of the pressure release valve is finalized in step 120, and the finished battery is optionally cycled in step 121 before the battery is ready for shipment, step 122.

Figure 12:
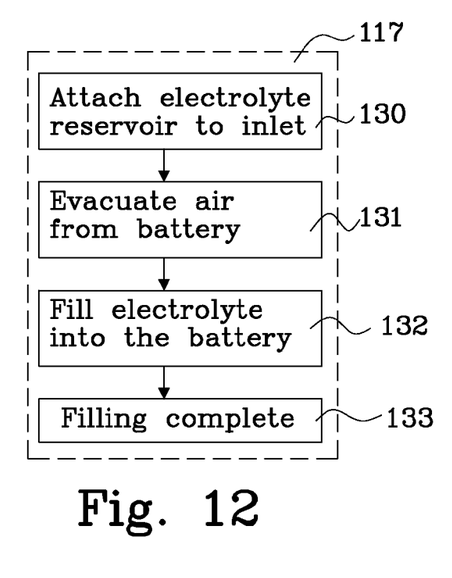
FIG. 12 shows a flowchart for filling a bipolar battery with electrolyte.

It should however be noted that it is possible to fill the battery with electrolyte during the assembling of each cell in step 108, but from a manufacturing point of view, the filling process as is disclosed in FIG. 12 is much more simple to implement.

The process for filling of the battery in step 117, comprises attachment of an electrolyte reservoir 72; 93 to an inlet 48 of a battery 40, e.g. the feed-through 48 of the pressure relief valve 47, see step 130.

The air in the battery is thereafter evacuated from the battery in step 131, either directly or indirectly by placing the battery in a vacuum chamber 71 that is evacuated. A separate outlet 81 for the air is possible, but the inlet 48 for the electrolyte may be used as an air outlet during the evacuation procedure.

Electrolyte is introduced into the battery 40 in step 132 after the air has been evacuated from the battery or during the evacuation dependent on the equipment configuration used, see FIGS. 9a to 9c. The electrolyte is distributed inside to the separators 45 inside the battery 40 using capillary forces.

A battery filled with electrolyte is obtained in step 133.

Figure 13:
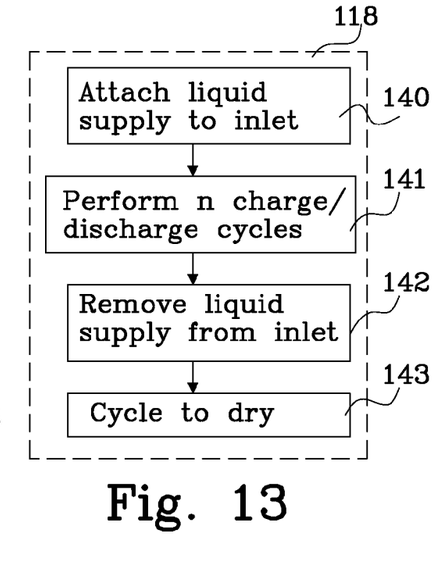
FIG. 13 shows a flow chart for formation of a bipolar battery.

The formation process of the battery in step 118 comprises two stages, where the first stage is charging and discharging cycles of the battery under "wet" conditions. The wet condition is provided in step 140 with attachment of a liquid supply to the inlet 48 of the battery. The liquid could either be water or electrolyte.

At least two charge/discharge cycles "n" are thereafter performed in step 141.

Stage two is performed under more or less "dry" conditions by removing the liquid supply from the inlet 48 in step 142, and thereafter performing a predetermined number of charge/discharge cycles to dry out the battery 40 from excess electrolyte in step 143.

A starved battery is thus produced.

Although the specification only discloses a NiMH bipolar battery, it should be noted that the same technology may be applied when producing any type of Nickel based bipolar battery, including but not limited to Nickel Cadmium NiCd bipolar batteries, Nickel Zinc NiZn bipolar batteries, etc.

The gasket should not be limited to one used in NiMH bipolar batteries. It can include any type of bipolar battery, including but not limited to as one having a starved electrolyte configuration for example.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for manufacturing a bipolar battery, the method comprising:
    providing positive electrodes, separators, negative electrodes and at least one biplate to construct a plurality of battery cells inside a case, arranged between a positive endplate and a negative endplate;
    providing a positive access point to the positive endplate, and a negative access point to the negative endplate;
    providing a gasket in the shape of a frame and arranged at least one of between each biplate or between a biplate and an endplate, the gasket at least partially encompassing a peripheral surface of the biplate, the gasket including a gas channel extending between adjacent battery cells to create a common gas space defined within the battery cells and the gas channel of each gasket, wherein the common gas space does not extend outside of the gasket and into a space existing between the gasket and the case;

providing a passage to the common gas space from the outside of the battery;

compressing all gaskets arranged between the positive endplate and the negative endplate to provide an outer pressure tight seal for the battery and to prevent the formation of electrolyte paths between adjacent cells; and filling the separators with electrolyte.

2. The method according to 1, further comprising:

after filling the separators with electrolyte, performing at least two charging and discharging cycles of the bipolar battery.

3. The method according to claim 2, wherein the at least two charging and discharging cycles are performed with a liquid supply attached to the passage, and wherein additional charging and discharging cycles of the bipolar battery are performed without the liquid supply attached to the passage to remove excess liquid from the bipolar battery.

4. The method according to claim 3, wherein the liquid supply delivers at least one of water and electrolyte to the bipolar battery.

5. The method according to claim 1, wherein filling the separators with electrolyte comprises:

attaching an electrolyte reservoir to the passage;

evacuating air from the common gas space;

filling electrolyte into the common gas space; and transferring electrolyte from the common gas space to the separators.

6. The method according to claim 5, wherein the air is evacuated from the common gas space through the passage before the electrolyte is filled into the common gas space.

7. The method according to claim 5, wherein the air in the common gas space is evacuated using an opening being separate from the passage, whereby the electrolyte is introduced into the common gas space during evacuation.

8. The method according to claim 1, wherein the method is for manufacturing a starved electrolyte bipolar battery.

9. A method comprising:

providing a case;

providing at least two battery cells inside the case;

arranging a biplate between the battery cells;

providing a first gasket on a major surface of the biplate, and a second gasket on an opposed major surface of the biplate, wherein each of the first and the second gaskets is in the shape of a frame, wherein each of the first and the second gaskets includes a gas channel to create a common gas space defined within the battery cells and the gas channel of each gasket, wherein the common gas space does not extend outside of the first and the second gaskets and into a space existing between the first and the second gaskets and the case, and wherein at least one of the first and the second gaskets partially encompasses a peripheral surface of the biplate;

compressing the first and the second gaskets; and filling the separators with electrolyte.

* * * * *